Feb. 24, 1942.    L. S. CUSHMAN    2,274,043
MOTORIZED BICYCLE
Filed July 25, 1940
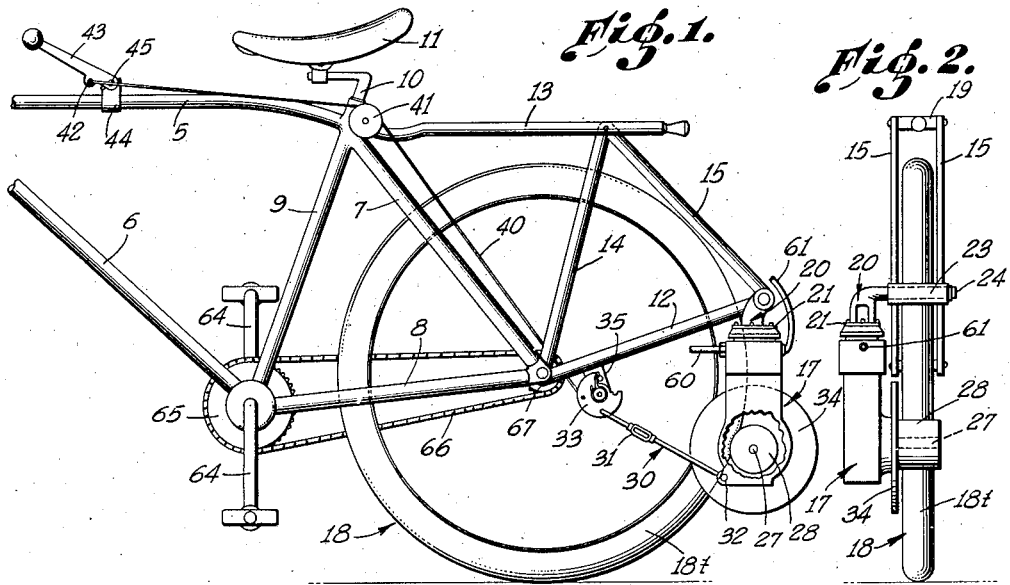
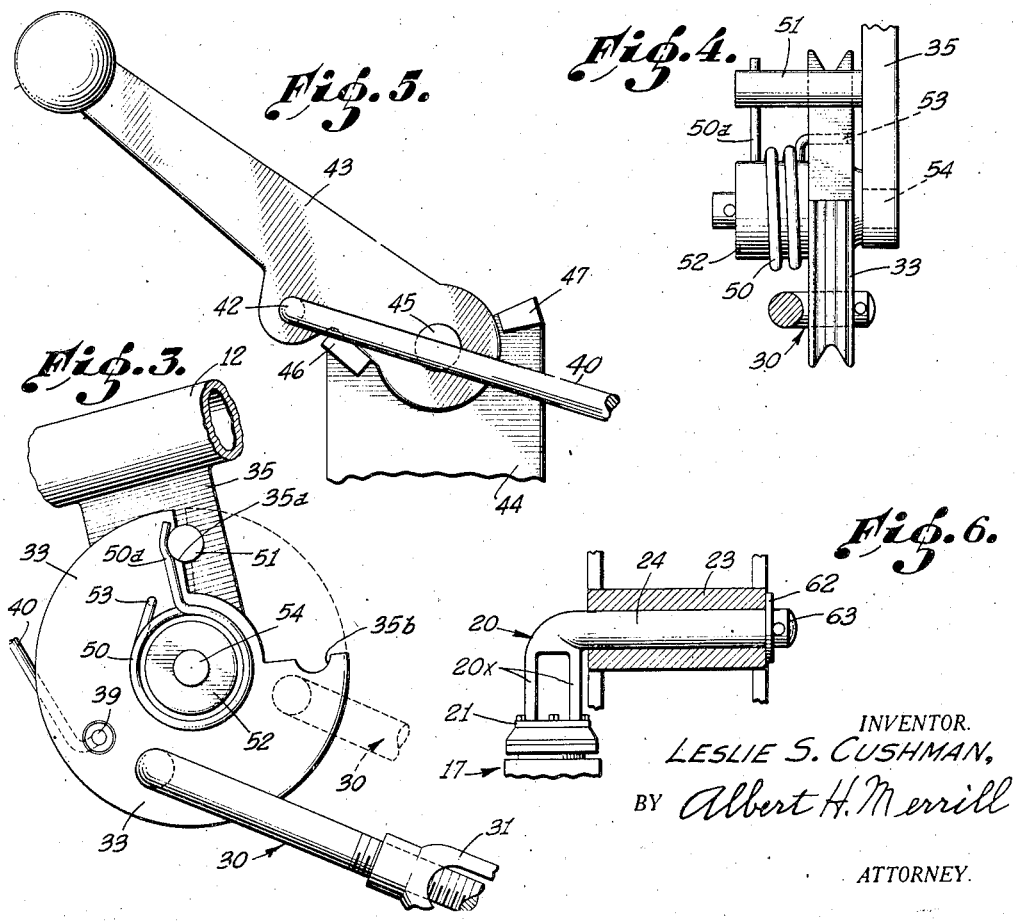
INVENTOR.
LESLIE S. CUSHMAN,
BY Albert H. Merrill
ATTORNEY.

Patented Feb. 24, 1942

2,274,043

UNITED STATES PATENT OFFICE 2,274,043

MOTORIZED BICYCLE

Leslie S. Cushman, Riverside, Calif.

Application July 25, 1940, Serial No. 347,449

5 Claims. (Cl. 180—33)

This invention relates to a bicycle equipped with a motor, and more particularly to an improved means for attaching a motor to a bicycle and for controlling its operative relation to one of the wheels of the bicycle.

Among the objects of the invention are: to provide an improved means for suspending the motor for driving the bicycle from the bicycle frame in such a manner that it may be conveniently swung to and from an operative relation to one of the wheels of the bicycle; to provide, for a swingably mounted motor, improved, manually operable means for swinging said motor from an inoperative to an operative position and vice versa; to provide an improved means for transmitting manually supplied force from an upper portion of the vehicle to a rear lower portion thereof, at which point it is utilized to move the motor from an inoperative to an operative position, and to provide a better means for detachably securing the motor to the bicycle.

More specifically speaking, the invention includes means for swingably mounting a motor having a power transmitting wheel, in such a position that said wheel, by manually operable means, may be swung into a contacting operative relation to one of the wheels of the bicycle.

An additional object of the invention is to provide means for mounting an internal combustion motor on a bicycle to propel it, without having to change the construction of the bicycle itself except as to a few minor details having to do with conventional attaching elements, the motor, nevertheless, being attached to the bicycle in a secure, dependable manner with a minimum addition to the weight thereof.

The invention further includes the provision of turnable means, operable beyond dead centers, for adjustment both to the operative and inoperative positions, thus positively maintaining the desired adjustment of the operating mechanism both in its operative and in its inoperative position.

Other improvements included in the invention relate to the provision of a more sturdy, dependable means for positively moving the adjustable parts and then holding them in the positions requisite to maintaining the motor carried by the vehicle either in a disconnected or in a driving relation thereto.

Other objects, advantages, and features of invention will hereinafter appear.

Referring to the accompanying drawing, which illustrates what is at present deemed to be a preferred embodiment of the invention, Fig. 1 is a side elevation of a bicycle equipped with a motor which is swingable to and from an operative or driving position in relation thereto, the motor being shown in its driving or operative position. The front portion of the vehicle is broken away to contract the view and a fragment of the motor is broken away to disclose underlying structure.

Fig. 2 is a rear elevation of the bicycle shown in Fig. 1.

Fig. 3 is a side elevation of a segmentally cut away sheave wheel which serves as a connecting link between a manually operable traction connection and a connecting rod which cooperates with said connection and wheel to transmit manually supplied force to the motor for the purpose of swinging the latter to and from its driving or operative position.

Fig. 4 is an elevation of the structure shown in Fig. 3, looking from right to left in respect to the latter view.

Fig. 5 is a detail showing in side elevation the mounting means of the manually operable handle which is used to swing the motor.

Figs. 3, 4, and 5 are on a larger scale than Figs. 1 and 2.

Fig. 6 is an enlarged, sectional reproduction of a part of the motor mounting means as viewed in Fig. 2.

Referring in detail to the drawing, the bicycle frame shown comprises upper and lower front frame tubes 5 and 6, and upper and lower rear frame tubes 7 and 8, these tubes being part of a frame which is braced in a well known manner by means of the saddle pillar 9 that supports the post 10 which carries the saddle 11. In addition to these somewhat conventional parts the frame includes a rear extension which comprises a lower mounting bar 12, an upper mounting bar 13, and the two brace bars 14 and 15, said bars 12, 14, and 15 forming a triangular extension of the main frame from the rear extremity of which extension the motor 17 is pendantly mounted. It is to be understood that such of the frame bars which have been described as are located besides the rear vehicle wheel 18 are in pairs, one member of each pair being at each side of the wheel 18. As shown in Fig. 2 a top cross bar 19 intersects the rear top bar 13 of the frame extension and not only serves as an attaching means for the upper end of each bar 14 and 15 but also spaces these bars apart the proper distance. Describing somewhat more specifically the motor attaching framework, the paired bars 12, 14 and 15 are rigid and are shown substantially straight and arranged to form a triangle which has one of its apices directed upwardly, said apex being rigidly connected, by means of the top spacing bar 19, with the rear portion of the backwardly extending top bar 13.

The motor 17 is swingingly supported by means of a bracket 20, said bracket carrying a base plate 21 which is shown bolted to the head of the engine. The upper end of said bracket is connected with the bars 12 and 15 where they join each other at the rear of the vehicle, by means of a sleeve 23. Said sleeve 23 unites the two side portions of the rear extension of the bicycle frame from the rear extremity of which the motor is suspended, and serves to secure the paired bars of the frame extension to each other in properly spaced relations to the rear bicycle wheel 18 which is located between them. The stub shaft 24 is shown as integral with the bracket 20, as a lateral extension from the upper end thereof, and as extending through said sleeve 23 with a working fit in order to swingably suspend the motor. Said sleeve 23 unites the rear extremities of each pair of bars 12 and 15. By preference the body portion of the bracket 20 is formed with two spaced apart limbs 20x, as shown in Fig. 6, to lighten this part of the structure.

By the construction which has been described the motor 17 is mounted in a somewhat laterally offset relation to the rear vehicle wheel 18. Said motor carries a laterally extending shaft 27 to which is secured a drum-shaped driving wheel 28 which is positioned for adjustment into and out of a contacting driving relation to the vehicle wheel 18.

The means for swinging the motor, together with its driving wheel 28, to and from an operative relation to the wheel 18 includes a two part connecting rod 30, the two parts of said rod being connected by means of a turn-buckle 31 whereby, in a well known manner, the length of said rod may be varied to the desired extent. The back end of said rod 30 is pivotally connected at 32 to the lower portion of the motor casing, and the front end of said rod is pivotally connected in an eccentric manner to a sheave wheel 33. One of the frame extension bars 12 is shown provided with a downwardly extending bracket 35 whereby said sheave wheel 33 is rockably mounted.

Into the grooved portion of the sheave wheel 33 extends, and is there secured at 39, the lower end portion of a cable 40. The mid length portion of said cable passes over an idle pulley 41 which is shown mounted on the bicycle frame adjacent to the saddle post. From this point said cable extends forwardly and has its front end connected at 42 to a manually operable lever 43. The upper frame bar 5 carries a bracket 44 to which the lower end of the lever 43 is connected by means of a pin 45. Said lever is thus mounted to swing forward to the position shown in full lines in Figs. 1 and 5, having been arrested by means of a stop 46. When the lever has reached this position the pulling forward of the cable 40 has caused a turning movement of the sheave 33 which, in turn, has acted upon the connecting rod 30 and moved the motor wheel 28 into a contacting, driving relation to the wheel 18. When the lever 43 is swung rearwardly to the limit of its travel, its movement is arrested by a stop 47 against which an adjacent part of the lever abuts, and at this time a spiral spring 50 with which the sheave 33 is provided operates to take up the slack in the cable and to force the connecting rod 30 rearwardly a sufficient extent to disengage the motor wheel 28 from the wheel 18.

When the lever is in its foremost position the attachment 42 of the cable 40 is slightly below the pivotal mounting of the lever, and hence, at this time, the nearly horizontal front section of the cable 40 exerts a pull below dead center upon the lever, thereby, locking the parts controlled by the lever with the wheel 28 in a driving contact with the wheel tire 18t.

The pneumatic tire 18t of the wheel 18 cooperates well with the motor wheel 28 to form a friction drive. A fly-wheel 34 mounted concentric to the drive wheel 28 equalizes the rotation of said wheel.

As best shown in Fig. 3, a segmental portion of the sheave 33 is cut away in order to provide two stop shoulders 35a and 35b which cooperate with a stop pin 51 of bracket 35 to limit the turning movements of the sheave 33 to accord with the extent of the operative movements which have already been described. Said stop pin 51 is utilized to form an abutment for a radially extending arm 50a with which the spring 50 is furnished, said spring being coiled around the sheave hub 52 and having its opposite end anchored at 53 to the sheave. Near its lower end, bracket 35 carries a laterally extending stub shaft 54 upon which the sheave hub 52 is mounted with a working fit.

The illustration of the bicycle in Fig. 1 is of a somewhat diagrammatical character, some well known parts being omitted. It is, of course, to be understood that a fuel supply tank and other well known accessories for the internal combustion engine of the motor, including means for manual control, ignition and lubrication, will be mounted upon the bicycle frame. In Fig. 1 is shown a portion of a conduit 60 for fuel and oil tubes, and a portion of a conduit or cable 61 for electrical supply. Flexible or resilient oil and fuel conduit means of a well known kind will be used, which will not be injured by the swinging movement of the motor.

As best shown in Fig. 6, the end of the mounting shaft 24 which is farthest from the motor projects sufficiently to receive a washer 62 and a removable retaining pin 63. Upon the removal of said pin, the motor together with its accessories, may readily be detached from the bicycle.

The bicycle is shown provided with conventional pedals 64, front sprocket 65, driving chain 66 and rear sprocket 67, the conventional ratchet device being provided for the latter sprocket so that the rider may rest his feet in a motionless manner upon the pedals while the motor 17 is driving the bicycle.

If the motor at any time fails to function, the bicycle may be propelled in the usual manner till a place to repair the motor or replenish its fuel supply is reached.

The spring 50 is made strong enough to enable it when allowed to act, to hold the sheave shoulder 35b firmly against the back side of the stop pin 51, and when in this position the attachment point of connecting rod 30 to the sheave wheel 33 is slightly above the pivotal mounting of the sheave wheel 33, and hence, at this time, the push that might be exerted by motor, through connecting rod 30, is above dead center upon sheave wheel 33, thus at such time maintaining the drive wheel 28 in a properly spaced inoperative relation to the bicycle tire 18t. The distance of clearance between said wheel and said tire can be regulated as desired by adjusting the length of the connecting rod 30.

I claim:

1. In a motor-driven bicycle, the combination, with a bicycle frame having a rearward extension; of a motor swingably supported by said extension, a wheel carried by and driven from said motor and movable by the swinging of the latter into and out of contact with the periphery of the rear wheel of the bicycle, a spring carried by the bicycle and tending to hold said motor in a back swung position wherein said wheel carried thereby is out of engagement with the rear wheel of the bicycle, and pivotally mounted, stop controlled means to swing said motor against the opposition of said spring to a forward position wherein said motor driven wheel engages the periphery of the rear wheel of the bicycle to rotate the latter wheel, said means, at both limits of its travel, being arrested by stops at points beyond dead center.

2. The combination, with the ground wheels and frame of a bicycle; of a rearward extension for said frame, said extension including paired frame bars which include between them the rear wheel of the bicycle and which extend rearwardly to a point beyond the tire of said wheel, a sleeve located at said point and serving to secure said paired bars to each other in properly spaced relations to said rear wheel, a shaft turnably mounted within said sleeve, said shaft having a projecting end portion at one side of the bicycle, a pendant bracket formed as a downward continuation of said projecting shaft portion, a motor supported by said bracket, said motor having operatively mounted upon it a friction drive wheel rotatable thereby, and means to swing said motor to and from a position wherein said friction drive wheel engages the periphery of said rear wheel of the bicycle.

3. The combination, with the ground wheels and frame of a bicycle; of a rearward extension for said frame, said extension including a triangular frame section made up of a plurality of pairs of bars, the bars of each pair being at opposite sides of the bicycle, said triangular frame having an angular portion which is located at a point rearwardly of the tire of the rear wheel of the bicycle, a sleeve located at said point and serving to secure said paired bars to each other in properly spaced relation to said rear wheel, a shaft fastened within said sleeve in a turnable relation thereto, said shaft having a projecting end portion at one side of the bicycle, a pendant bracket, formed as a downward continuation of said projecting shaft portion, a motor supported by said bracket, said motor having operatively mounted upon it a friction drive wheel rotatable thereby, and means to swing said motor to and from position wherein said friction drive wheel engages the periphery of said rear wheel of the bicycle.

4. The subject matter of claim 3 and, said shaft being removable in an endwise manner from said sleeve to detach the motor from the bicycle, and means normally retaining said shaft within said sleeve.

5. In a structure for pendantly supporting a motor to swing to and from an operative relation to the back side of the rear wheel of a bicycle, the combination, with the ground wheels and frame of the bicycle, said frame having a backwardly extending top bar at its rear end; of a frame section made up of rigid bars shaped as a triangle having one of its apices directed rearwardly and another of its apices directed upwardly to said top bar and rigidly connected therewith at a point rearward of the axis of said rear wheel, and a motor mounting means swingably supported in a pendant manner from said rearwardly directed apex portion of said triangular frame, the third apex of said triangular frame being supported upon the bicycle frame.

LESLIE S. CUSHMAN.